United States Patent
Ge et al.

(10) Patent No.: US 11,283,473 B2
(45) Date of Patent: Mar. 22, 2022

(54) RADIO FREQUENCY FRONT-END CIRCUIT, CIRCUIT BOARD THEREOF AND TERMINAL

(71) Applicant: JRD COMMUNICATION (SHENZHEN) LTD., Shenzhen (CN)

(72) Inventors: Liangbo Ge, Shenzhen (CN); Hongjuan Xing, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 0 days.

(21) Appl. No.: 16/910,165

(22) Filed: Jun. 24, 2020

(65) Prior Publication Data
US 2020/0328764 A1    Oct. 15, 2020

Related U.S. Application Data

(63) Continuation of application No. PCT/CN2018/123007, filed on Dec. 24, 2018.

(30) Foreign Application Priority Data

Dec. 25, 2017    (CN) .......................... 201711440216.X

(51) Int. Cl.
*H04B 1/00* (2006.01)
*H01Q 1/22* (2006.01)
*H04L 5/14* (2006.01)

(52) U.S. Cl.
CPC ......... *H04B 1/0064* (2013.01); *H01Q 1/2291* (2013.01); *H04L 5/1461* (2013.01)

(58) Field of Classification Search
CPC .................................................. H04B 1/0064
See application file for complete search history.

(56) References Cited

U.S. PATENT DOCUMENTS 6,282,184 B1 * 8/2001 Lehman ............... H04B 1/0003
370/278
8,139,670 B1 * 3/2012 Son ..................... H04B 7/0413
375/267

(Continued)

FOREIGN PATENT DOCUMENTS

CN    101304580 A    11/2008
CN    101432984 A    5/2009

(Continued)

OTHER PUBLICATIONS

International search report,PCT/CN2018/123007, dated Mar. 27, 2019 (2 pages).

(Continued)

*Primary Examiner* — Hsinchun Liao

(57) ABSTRACT

The present disclosure provides an RF front-end circuit and a circuit board thereof, a terminal. The RF front-end circuit may include an RF transceiver and a first RF circuit, a second RF circuit, a third RF circuit and a fourth RF circuit connecting to the RF transceiver respectively. The first RF circuit may be connected to a first antenna. The second RF circuit may be connected to a second antenna. The third RF circuit may be connected to a third antenna. The fourth RF circuit may be connected to a fourth antenna. The first RF circuit, the second RF circuit, the third RF circuit and the fourth RF circuit may be independent from each other.

17 Claims, 7 Drawing Sheets

(56) References Cited

U.S. PATENT DOCUMENTS

2013/0028148 A1* 1/2013 Heo .................. H04B 1/406
370/278
2013/0114588 A1 5/2013 Kyperountas et al.

FOREIGN PATENT DOCUMENTS

| CN | 102710278 A | 10/2012 |
| CN | 103378887 A | 10/2013 |
| CN | 104244291 A | 12/2014 |
| CN | 105634569 A | 6/2016 |
| CN | 108282182 A | 7/2018 |
| WO | WO2008127993 A1 | 10/2008 |

OTHER PUBLICATIONS

First Office Action from China patent office in a counterpart Chinese patent Application 201711440216.X, dated Nov. 27, 2019 (10 pages).

* cited by examiner

RADIO FREQUENCY FRONT-END CIRCUIT, CIRCUIT BOARD THEREOF AND TERMINAL

CROSS REFERENCE TO RELATED APPLICATION

The present application is a continuation-application of International (PCT) Patent Application No. PCT/CN2018/123007 filed on Dec. 24, 2018, which claims foreign priority of Chinese Patent Application No. 201711440216.X, filed on Dec. 25, 2017, in the National Intellectual Property Administration of China, the entire contents of which are hereby incorporated in their entireties.

TECHNICAL FIELD

The present disclosure relates to a field of radio frequency (RF) technology, and in particular relates to an RF front-end circuit, a circuit board thereof and a terminal.

BACKGROUND

With continuous development of the mobile communication technology, the communication requirement for mobile terminals is more and more higher. At present, mobile intelligent terminals have generally supported multiple frequency band 2G, 3G and 4G LIE networks. Among them, most medium-to-high level mobile intelligent terminals could support LTE carrier aggregation (CA) technology. Signals in multiple frequency bands may be aggregated together by the LET carrier aggregation technology to boost the downlink and uplink transmission rate of the LTE networks, To further boost the downlink transmission rate of the LTE downlink network, a downlink 4×4 multiple input multiple output (MIMO) technology is introduced into the mobile intelligent terminal. Compared with the original LTE downlink 2×2 MIMO, the LTE downlink 4×4 MIMO may greatly improve the single-user peak rate and system capacity, but it may also bring great challenges to the design of the RF front-end circuits of the mobile intelligent terminals. Compared with the original LTE downlink 2×2 MIMO, the LTE downlink 4×4 MIMO may also need to add two downlink receiving RF channels. But in order to achieve the LTE downlink 4×4 MIMO and carrier aggregation of multiple frequency bands respectively at the same time, carrier aggregations of multiple frequency bands must be separately achieved in all the four downlink receiving RF channels, which may greatly increase the design complexity and occupied area of the RF front-end circuits.

In the related art, the design of the RF front-end circuit usually mixes the components in the four downlink receiving RF channels of the RF front-end circuit. For example, the first downlink receiving RF channel and the third downlink receiving RF channel may share a multi-frequency terminal component that is of high price and occupies large area. At this time, even it is not necessary to support the third downlink receiving RF channel on the hardware side, these shared multiple frequency band terminal components still need to be retained in the hardware circuit in order to ensure the normal operation of the first downlink receiving RF channel.

SUMMARY OF THE DISCLOSURE

A technical solution adopted by the present disclosure is to provide a multiple frequency band communication terminal. The terminal may include an RF front-end circuit, a processor, a fifth antenna and a Wi-Fi transceiver. The RF transceiver of the RF front-end circuit may be connected with the processor. The fifth antenna may be connected with the processor through the Wi-Fi transceiver. The RF front-end circuit may include an RF transceiver and a first RF circuit, a second RF circuit, a third RF circuit and a fourth RF circuit each connecting to the RF transceiver. The first RF circuit may be connected to the first antenna, the second RF circuit may be connected to the second antenna, the third RF circuit may be connected to the third antenna, the fourth RF circuit may be connected to the fourth antenna.

The first RF circuit, the second RF circuit, the third RF circuit and the fourth RF circuit may be independent from each other.

The first RF circuit may comprise a first frequency divider, a second frequency divider, a first frequency band transmission and first reception circuit, a second frequency band transmission and first reception circuit, a third frequency band transmission and first reception circuit.

The first frequency divider may be connected to the first antenna, the first frequency band transmission and first reception circuit and the second frequency divider. The second frequency divider may be further connected to the second frequency band transmission and first reception circuit and the third frequency band transmission and first reception circuit.

The first frequency band transmission and first reception circuit may be connected to the first frequency band transmission port and the first frequency band first reception port of the RF transceiver. The second frequency band transmission and first reception circuit may be connected to the second frequency band transmission port and the second frequency band first reception port of the RF transceiver. The third frequency band transmission and first reception circuit may be connected to the third frequency band transmission port and the third frequency band first reception port of the RF transceiver.

A frequency of the first frequency band signal transmitted by the first frequency band transmission and first reception circuit may be greater than a frequency of the second frequency band signal transmitted by the second frequency band transmission and first reception circuit. The frequency of the second frequency band signal transmitted by the second frequency band transmission and first reception circuit may be greater than a frequency of the third frequency band signal transmitted by the third frequency band transmission and first reception circuit.

To solve the above-mentioned technical problem, another technical solution adopted by the present disclosure is to provide a circuit board. Preset positions for preparing a first RF circuit, a second RF circuit, a third RF circuit and a fourth RF circuit independent from each other may be preset on the circuit board.

The first RF circuit, the second RF circuit, the third RF circuit and the fourth RF circuit may be configured to be connected to the RF transceiver. The first RF circuit may be connected to the first antenna, the second RF circuit may be connected to the second antenna, the third RF circuit may be connected to the third antenna, the fourth RF circuit may be connected to the fourth antenna.

The first RF circuit, the second RF circuit, the third RF circuit and the fourth RF circuit may be independent from each other.

To solve the above-mentioned technical problem, yet another technical solution adopted by the present disclosure is to provide an RF front-end circuit. The RF front-end circuit may include an RF transceiver and a first RF circuit, a second RF circuit, a third RF circuit and a fourth RF circuit each connecting to the RF transceiver. The first RF circuit may be connected to the first antenna, the second RF circuit may be connected to the second antenna, the third RF circuit may be connected to the third antenna, the fourth RF circuit may be connected to the fourth antenna.

The first RF circuit, the second RF circuit, the third RF circuit and the fourth RF circuit may be independent from each other.

DETAILED DESCRIPTION

To enable those skilled in the art to better understand the technical solutions of the present invention, the present disclosure will be described in further detail below with reference to the drawings and specification. Obviously, the implementations described are only part of the implementations of the present disclosure, but not all of them. Based on implementations of the present disclosure, all other implementations obtained by a person of ordinary skills in the art without creative efforts would fall in a protection scope of the present disclosure.

Figure 1:
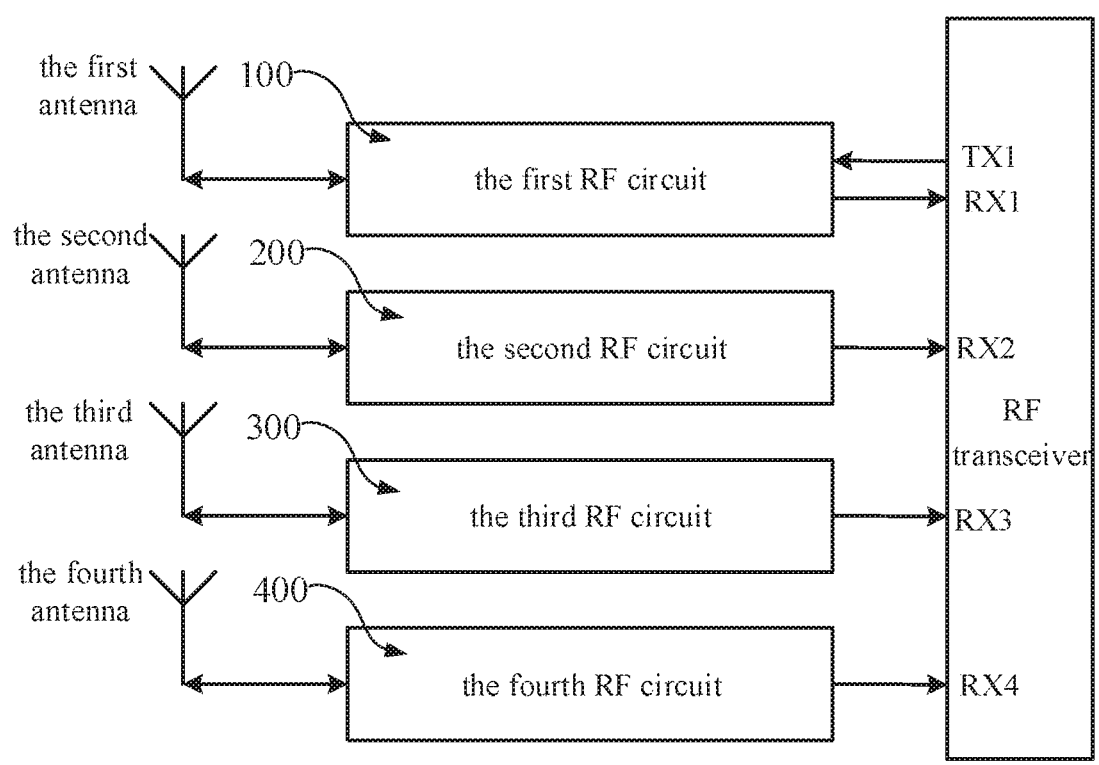
FIG. 1 is a schematic structural diagram of an RF front-end circuit according a first embodiment of the present disclosure.

Please referring to FIG. 1, FIG. 1 is a schematic structural diagram of an RF front-end circuit according to a first embodiment of the present disclosure. As is shown in FIG. 1, the RF front-end circuit in the present embodiment may include an RF transceiver and a first RF circuit 100, a second RF circuit 200, a third RF circuit 300 and a fourth RF circuit 400 each connecting to the RF transceiver. The first RF circuit 100 may be connected a first antenna. The second RF circuit 200 may be connected to a second antenna. The third RF circuit 300 may be connected to a third antenna. The fourth frequency circuit 400 may be connected to a fourth antenna. The first RF circuit 100, the second RF circuit 200, the third RF circuit 300 and the fourth RF circuit 400 may be independent from each other.

Further, as is shown in FIG. 1, the first RF circuit 100 may be connected a first reception port RX1 and a transmission port TX1 of the RF transceiver operating at a corresponding frequency band. The second RF circuit 200 may be connected to a second reception port RX2 of the RF transceiver operating at a corresponding frequency band. The third RF circuit 300 may be connected to a third reception port RX3 of the RF transceiver operating at a corresponding frequency band. The fourth RF circuit 400 may be connected to a fourth reception port RX4 of the RF transceiver operating at a corresponding frequency band.

In the present embodiment, the RF front-end circuits may be set as independent structures, thus operations of the multiple RF front-end circuits may not interfere with each other.

Figure 2:
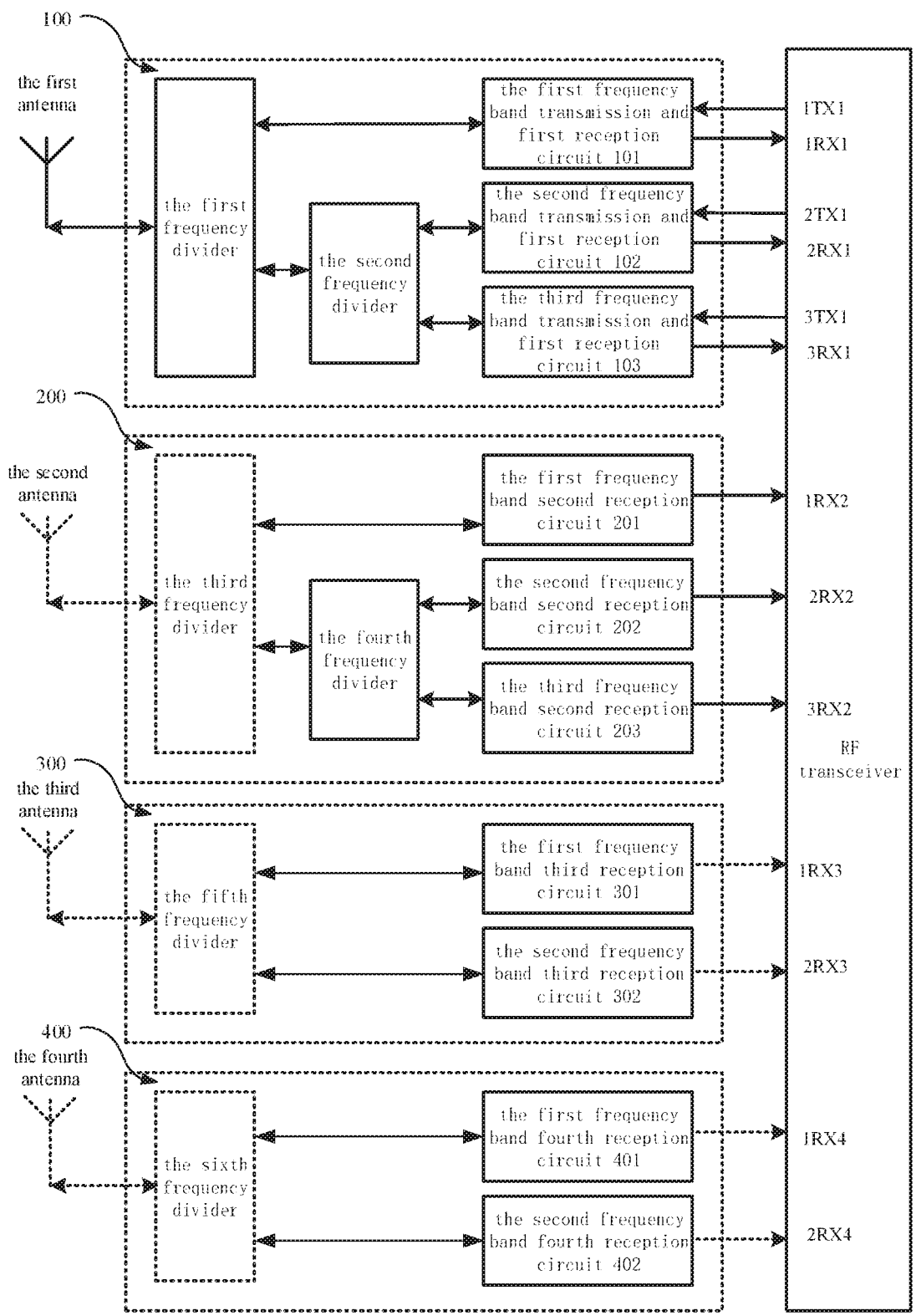
FIG. 2 is a schematic structural diagram of an RF front-end circuit according to a second embodiment of the present disclosure.

Please further referring to FIG. 2, as is shown in FIG. 2, the first RF circuit 100 may include a first frequency divider, a second frequency divider, a first frequency band transmission and first reception circuit 101, a second frequency band transmission and first reception circuit 102, a third frequency band transmission and first reception circuit 103. The first frequency divider may be respectively connected the first antenna, the first frequency band transmission and first reception circuit 101 and the second frequency divider. The second frequency divider may be further respectively connected to the second frequency hand transmission and first reception circuit 102 and the third frequency band transmission and first reception circuit 103.

The first frequency band transmission and first reception circuit 101 may be connected to a first frequency band transmission port 1TX1 and a first frequency band first reception port 1RX1 of the RF transceiver. The second frequency band transmission and first reception circuit 102 may be connected to a second frequency band transmission port 2TX1 and a second frequency hand first reception port 2RX1 of the RF transceiver. The third frequency band transmission and first reception circuit 103 may be connected to a third frequency band transmission port 3TX1 and a third frequency band first reception port 3RX1 of the RF transceiver.

In the above-mentioned first RF circuit 100, the second frequency divider may be connected to the first frequency divider, and may be connected to the second frequency band transmission and first reception circuit 102, the third frequency band transmission and first reception circuit 103, thereby realizing a downlink carrier aggregation of the second frequency band first channel reception and the third frequency band first channel reception. The first frequency divider may be further connected to the first frequency band transmission and first reception circuit 101, thereby realizing a downlink carrier aggregation of the first frequency band first channel reception, the second frequency band first channel reception and the third frequency band first channel reception.

In the present embodiment, a frequency of the first frequency band may be greater than a frequency of the second frequency band. A frequency of the second frequency band may be greater than a frequency of the third frequency band. In some applications, the first frequency band may be set as [3400 MHz,6000 MHz], e.g., frequency bands B42, B43, B46, B252, B255 and so on. The second frequency band may be set as [1400 MHz, 2700 MHz], e.g. frequency bands B1, B2, B3, 134, B11, B21, B25, B66, B34, B39, B7, B30, B38, B40 B41 and so on. The third frequency band may be set as [600 MHz, 1000 MHz], e.g., frequency bands B5, B6, B8, B12, BE, B14, B17, B18, B19, B20, B26, 1328, B29, B71 and so on. With the above-mentioned first RF circuit 100, communications of signals of frequencies including the above-mentioned first frequency band, the second frequency band the third frequency band may be realized.

Please further referring to FIG. 2, the second RF circuit 200 may include a third frequency divider, a fourth frequency divider, a first frequency band second reception circuit 201, a second frequency band second reception circuit 202, a third frequency band second reception circuit 203. The third frequency divider may be connected to the second antenna, the first frequency band second reception circuit 201 and the fourth frequency divider. The fourth frequency divider may be further connected to a second frequency band second reception circuit 202 and a third frequency band second reception circuit 203. The first frequency band second reception circuit 201 may be connected to a first frequency band second reception port 1RX2 of the RF transceiver. The second frequency band second reception circuit 202 may be connected to a second frequency band second reception port 2RX2 of the RF transceiver. The third frequency band second reception circuit 203 may be connected to a third frequency band second reception port 3RX2 of the RF transceiver.

In the above-mentioned second RF circuit 200, the fourth frequency divider may be connected to the third frequency divider, and may be connected to the second frequency band second reception circuit 202, the third frequency band second reception circuit 203, thereby realizing a downlink carrier aggregation of the second frequency band second channel reception and the third frequency band second channel reception. The third frequency divider may be further connected to the first frequency band second reception circuit 201, thereby realizing a downlink carrier aggregation of the first frequency hand second channel reception, the second frequency band second channel reception and the third frequency hand second channel reception.

Please further referring to FIG. 2, the third RF circuit 300 may include a fifth frequency divider, a first frequency band third reception circuit 301 and a second frequency band third reception circuit 302. The fifth frequency divider may be connected the third antenna, a first frequency band third reception circuit 301 and a second frequency band third reception circuit 302. The first frequency band third reception circuit 301 may be further connected to a first frequency band third reception port 1RX3 of the RF transceiver, and the second frequency band third reception circuit 302 may be further connected to a second frequency band third reception port 2RX3 of the RF transceiver.

The fifth frequency divider may be connected to the first frequency band third reception circuit 301 and the second frequency band third reception circuit 302, thereby realizing a downlink carrier aggregation of the first frequency band third channel reception and the second frequency band third channel reception.

Please further referring to FIG. 2, the fourth RF circuit 400 may include a sixth frequency divider, a first frequency band fourth reception circuit 401 and a second frequency band fourth reception circuit 402. The sixth frequency divider may be connected to the fourth antenna, a first frequency band fourth reception circuit 401 and a second frequency band fourth reception circuit 402. The first frequency band fourth reception circuit 401 may be connected to a first frequency band fourth reception port 1RX4 of the RF transceiver, and the second frequency band fourth reception circuit 402 may be connected to a second frequency band fourth reception port 2RX4 of the RF transceiver.

The sixth frequency divider may be connected to the first frequency band fourth reception circuit 401 and the second frequency band fourth reception circuit 402, thereby realizing a downlink carrier aggregation of the first frequency band fourth channel reception and the second frequency band fourth channel reception.

In the present embodiment, the four RF circuits of the above-mentioned RF front-end circuit may be used to realize the LTE downlink 4×4 MIMO and the carrier aggregation.

Figure 3:
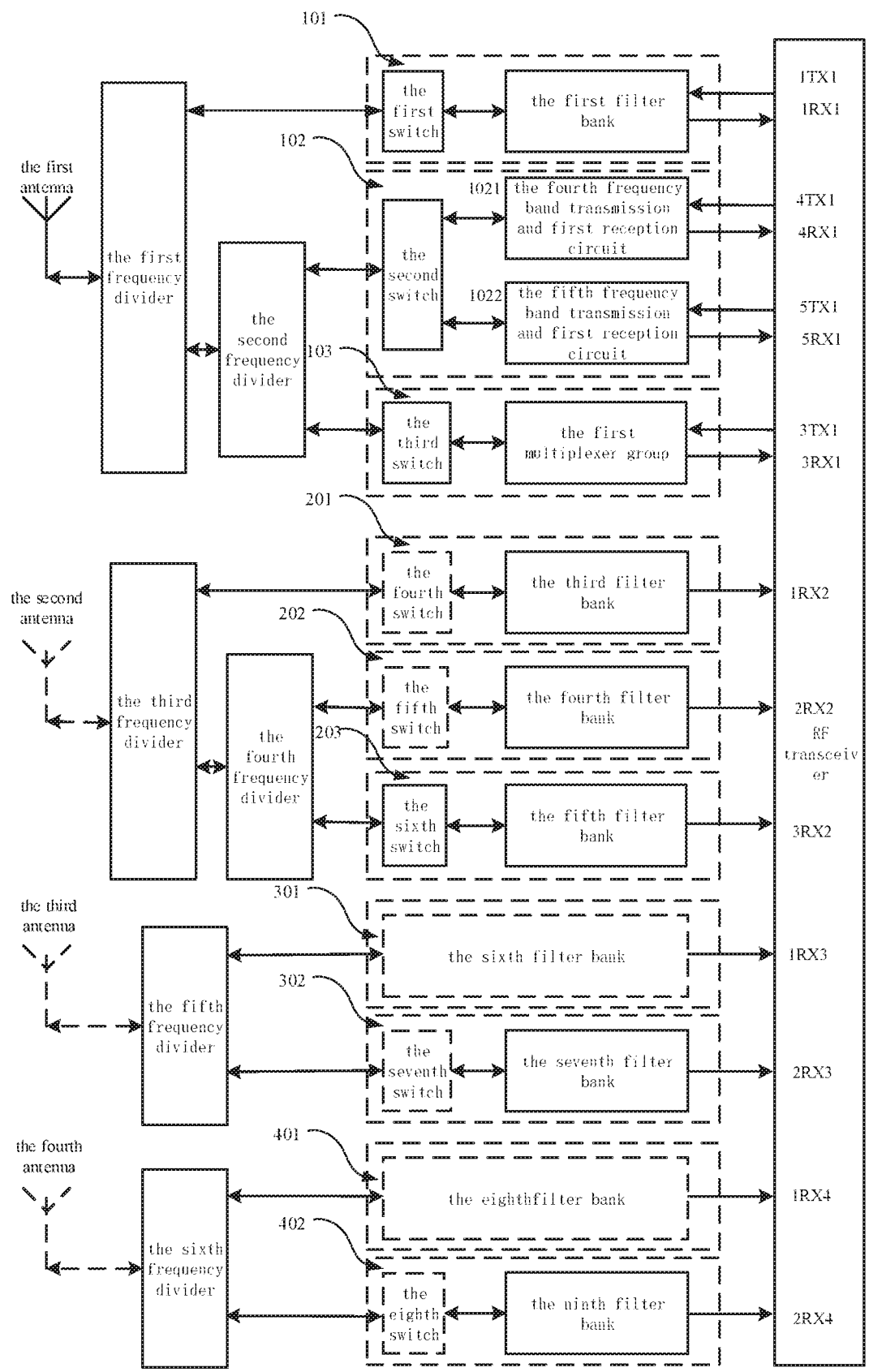
FIG. 3 is a schematic structural diagram of an RF front-end circuit according to third embodiment of the present disclosure.

Please further referring to FIG. 3, as is shown in FIG. 3, the first frequency band transmission and first reception circuit 101 may include a first switch and a first filter bank. The first switch may be connected to the first frequency divider. The first switch may be connected to the first frequency band transmission port 1TX1 and the first frequency band first reception port 1RX1 of the RF transceiver operating at a frequency hand corresponding to the first filter bank through the first filter bank.

Figure 4:
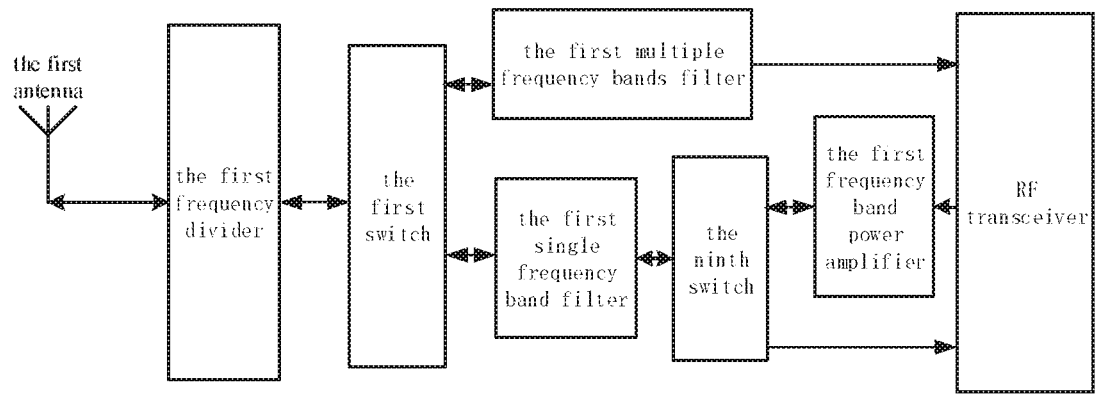
FIG. 4 is a schematic structural diagram of a first frequency band transmission and first reception circuit in FIG. 3.

Further, the first filter bank of the first frequency hand transmission and first reception circuit 101 in FIG. 3 may include at least a multiple frequency bands filter and at least a single frequency band filter. Communication frequency bands supported by the at least a multiple frequency bands filter and the at least a single frequency band filter may be different from each other. As is shown in FIG. 4, in the present embodiment, the first filter bank may include a first multiple frequency bands filter, a first single frequency hand filter, a ninth switch and a first frequency band power amplifier. The first multiple frequency bands filter and the first single frequency band filter may be each connected to the first switch, and the first multiple frequency bands filter may be further connected to the first reception port of the RF transceiver operating at frequency bands corresponding to the first multiple frequency hands filter, thus the frequency band of the first reception port may be same to the communicating frequency band supported by the first multiple frequency hands filter. The first single frequency band filter may be further connected to the ninth switch. The ninth switch may be further connected to a first frequency band power amplifier and the first reception port of the RF transceiver operating at a frequency band corresponding to the ninth switch. The first frequency band power amplifier may be further connected to a transmission port of the RF transceiver operating at a frequency band corresponding to the first frequency band power amplifier. In this case, a frequency band of the first reception port of the RF transceiver connecting to the ninth switch and a frequency band of the transmission port of the RF transceiver connecting to the first frequency band power amplifier may all be same to a frequency band supported by the first single frequency band filter. The first switch may be used for gating and switching of communication signals of multiple frequency bands supported by the first multiple frequency bands filter and the first single frequency band filter. The ninth switch may be used for switching between the transmission circuit and the first reception circuit of the RF transceiver operating at corresponding frequency bands.

In some applications, B46/252/255 multiple frequency bands filter may be chosen as the first multiple frequency bands filter, B42 single frequency band filter as the first single frequency band filter. Correspondingly, B46/252/255 multiple frequency bands filter may be connected to the B46/252/255 frequency band first reception port of the RF transceiver. The ninth switch may be connected to the B42 frequency band first reception port of the RF transceiver.

The first frequency band power amplifier may be connected to the B42 frequency band transmission port of the RF transceiver.

Please further referring to FIG. 3, as is shown in FIG. 3, the second frequency band transmission and first reception circuit 102 may include a second switch, a fourth frequency band transmission and first reception circuit 1021 and a fifth frequency band transmission and first reception circuit 1022. An end of the second switch may be connected to the second frequency divider. Meanwhile, the second switch may be connected to the fourth frequency band transmission and first reception circuit 1021 and the fifth frequency band transmission and first reception circuit 1022 respectively. The fourth frequency band transmission and first reception circuit 1021 may be further connected to the fourth frequency band transmission port 4TX1 and the fourth frequency band first reception port 4RX1 of the RF transceiver. The fifth frequency band transmission and first reception circuit 1022 may be further connected to the fifth frequency band transmission port 5TX1 and the fifth frequency band first reception port 5RX1 of the RF transceiver.

In the present embodiment, the fourth frequency band and the fifth frequency band may both be signals encompassed in the second frequency band. A frequency of the fourth frequency band may be greater than a frequency of the fifth frequency band. In some applications, the fourth frequency band may be set as [2300 MHz, 2700 MHz], e.g., frequency bands B7, B30, B38, B40, B41 etc. The fifth frequency band may be set as [1400 MHz, 2200 MHz], e.g., frequency bands B1, B2, B3, B4, B11, B21, B25, B66, B34, B39 etc.

Figure 5:
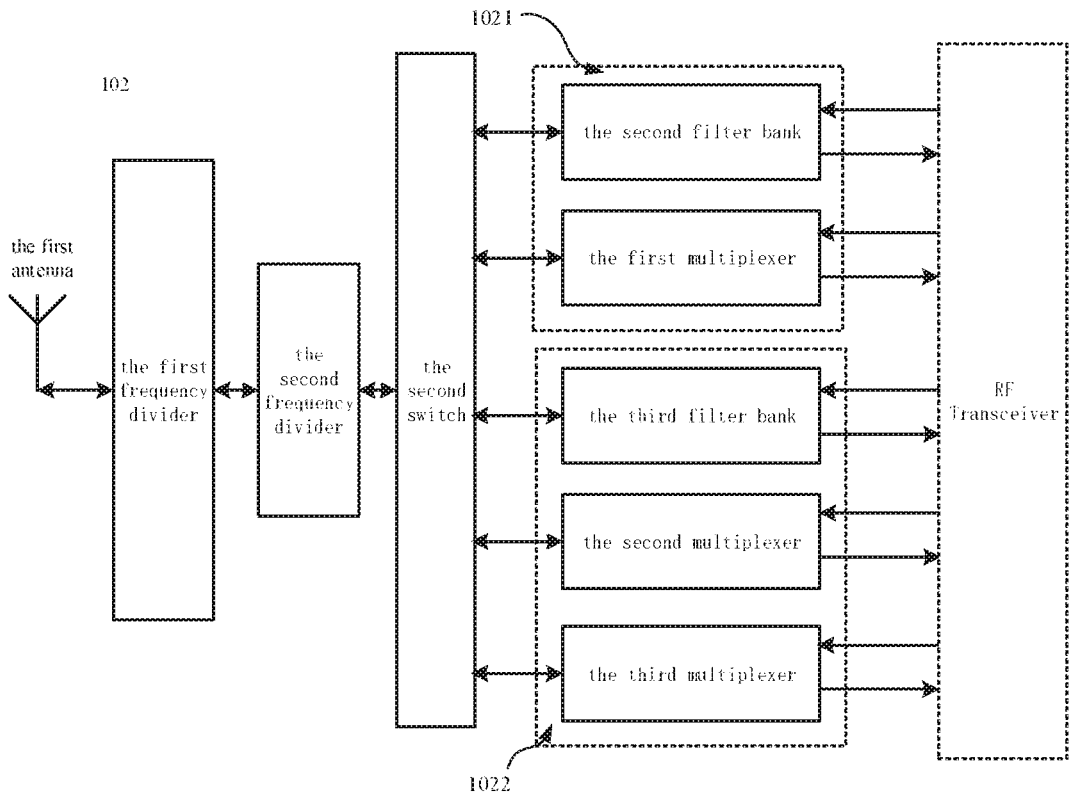
FIG. 5 is a schematic structural diagram of an embodiment of a second frequency band transmission and first reception circuit in FIG. 3.

Further, as is shown in FIG. 5, the fourth frequency band transmission and first reception circuit 1021 in FIG. 3 may include a second filter bank and a first multiplexer. The fifth frequency band transmission and first reception circuit 1022 may include a third filter bank, a second multiplexer and a third multiplexer. The second filter bank, the first multiplexer, the third filter bank, the second multiplexer and the third multiplexer may be each connected to the second switch. The second filter bank, the first multiplexer, the third filter bank, the second multiplexer and the third multiplexer may be connected to transmission ports and the first reception port of the RF transceiver operating at corresponding frequency bands.

Figure 6:
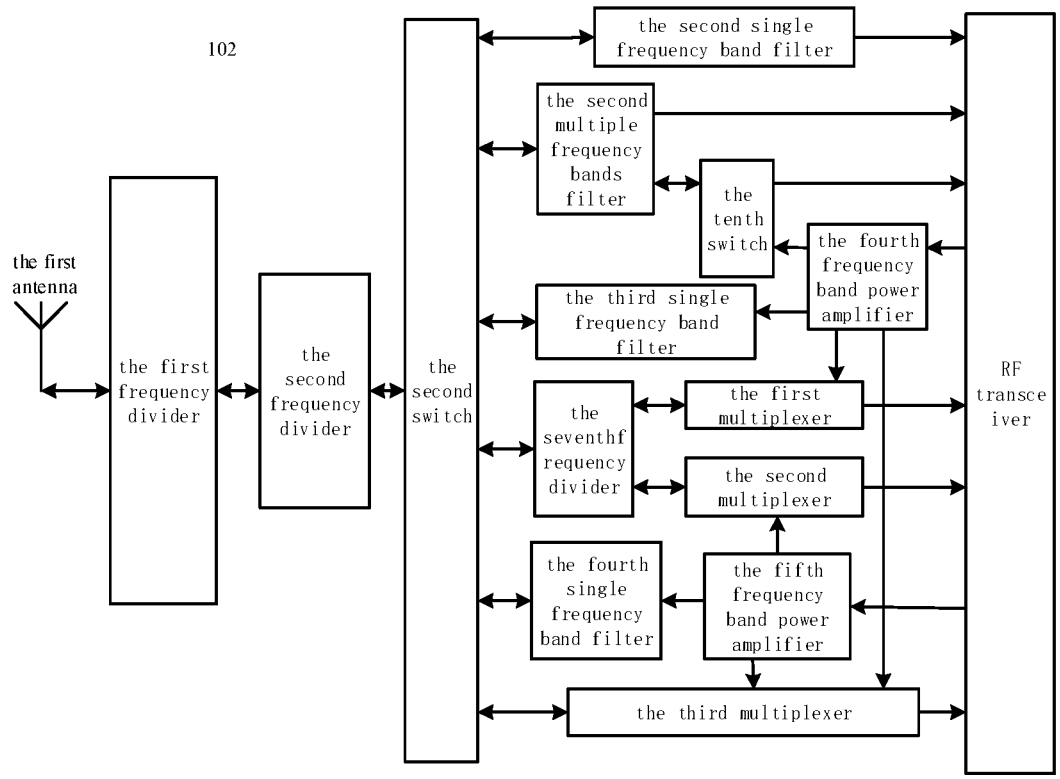
FIG. 6 is a schematic structural diagram of another embodiment of a second frequency band transmission and first reception circuit in FIG. 3.

Please also referring to FIG. 6, the second filter bank may include a second single frequency band filter, a third single frequency band filter, a second multiple frequency bands filter, a tenth switch, a fourth frequency band power amplifier. The second single frequency band filter, the third single frequency band filter, the second multiple frequency bands filter may be each connected to the second switch. The second single frequency band filter and the second multiple frequency bands filter may further be connected to the first reception port of the RF transceiver operating at corresponding frequency bands. The tenth switch may be connected to the second multiple frequency bands filter, the fourth frequency band power amplifier and the first reception port of the RF transceiver operating at a corresponding frequency band. The third single frequency band filter may further be connected to the fourth frequency band power amplifier. The first multiplexer may be connected to the fourth frequency band power amplifier and the first reception port of the RF transceiver operating at corresponding frequency bands. It should be appreciated that, in the present embodiment, the tenth switch, the third single frequency band filter and the first multiplexer may all be connected to the transmission port of the RF transceiver operating at corresponding frequency band through the fourth frequency band power amplifier. In the present embodiment, the tenth switch may be used for switching between the transmission port and the first reception port of the second multiple frequency bands filter corresponding to a signal of a certain frequency band.

Please further referring to FIG. 6, the third filter bank may include a fourth single frequency band filter and a fifth frequency band power amplifier. The fourth single frequency band filter may be connected to the second switch and the fifth frequency band power amplifier. The fifth frequency band power amplifier may be connected to the second multiplexer, the third multiplexer and the transmission port of the RF transceiver operating at corresponding frequency bands. The second multiplexer and the third multiplexer may be connected to the first reception port of the RF transceiver operating at corresponding frequency bands. The third multiplexer may be further connected to the second switch. As is shown in FIG. 6, the first multiplexer and the second multiplexer may be connected to the second switch through a seventh frequency divider. Further, the fourth single frequency band filter, the second multiplexer and the third multiplexer may be connected to the transmission port of the RF transceiver operating at corresponding frequency bands through the fifth frequency band power amplifier respectively, It should be appreciated that, the third multiplexer may support communication of communication signals with multiple frequency bands. Therefore, the third multiplexer may be connected to the transmission port of the RF transceiver operating at corresponding frequency bands through the fourth frequency band power amplifier.

It should be appreciated that, frequency bands of the transmission ports or reception ports of each component in the second frequency band transmission and first reception circuit 102 connecting to the RF transceiver may each he same to the communication frequency bands supported by each component.

In some applications, B40 single frequency band filter may be chosen as the second single frequency band filter, another B40 single frequency band filter as the third single frequency band filter, B39+B41 multiple frequency bands filter as the second multiple frequency bands filter, B39 single frequency band filter as the fourth single frequency band filter, B7 duplexer as the first multiplexer, B1+B3 quadruplexer as the second multiplexer, B2+B4/B66+B30 hexaplexer as the third multiplexer.

Please further referring to FIG. 3, the third frequency band transmission and first reception circuit 103 may include the third switch and the first multiplexer group. One end of the third switch may be connected to the second frequency divider, another end may be connected to the first multiplexer group. The first multiplexer group may be connected to the third frequency band transmission port 3TX1 and the third frequency band first reception port 3RX1 of the RF transceiver.

Figure 7:
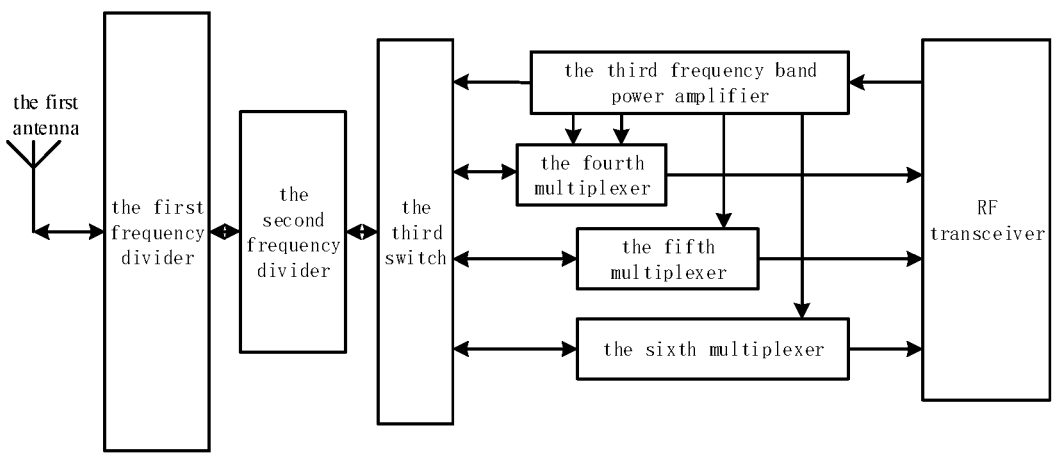
FIG. 7 is a schematic structural diagram of a third frequency band transmission and first reception circuit in FIG. 3.

Please further referring to FIG. 7, the first multiplexer group of the third frequency band transmission and first reception circuit 103 in FIG. 3 may include a fourth multiplexer, a fifth multiplexer, a sixth multiplexer and a third frequency hand power amplifier. The fourth multiplexer, the fifth multiplexer, the sixth multiplexer and the third frequency band power amplifier may be each connected to the third switch. The fourth multiplexer, the fifth multiplexer and the sixth multiplexer may be each connected to the first reception port of the RF transceiver operating at corresponding frequency bands. The third frequency band power amplifier may be connected to the transmission port of the RF transceiver operating at corresponding frequency band. As is shown in FIG. 7, the fourth multiplexer, the fifth multiplexer and the sixth multiplexer may each be connected to a transmission port of the RF transceiver operating at corresponding frequency bands through the third frequency band power amplifier. In the present embodiment, the third switch may be used for the gating and switching between multiple communication frequency bands supported by the fourth multiplexer, the fifth multiplexer and the sixth multiplexer.

It should be appreciated that, the frequency band of the first reception port of the RF transceiver connecting to the fourth multiplexer may be same to the communication frequency band supported by the fourth multiplexer. The frequency band of the first reception port of the RF transceiver connecting to the fifth multiplexer may be same to the communication frequency band supported by the fifth multiplexer. The frequency band of the first reception port of the RF transceiver connecting to the sixth multiplexer may be same to the communication frequency band supported by the sixth multiplexer. Further, a frequency band of the transmission port of the RF transceiver connecting to the third frequency band power amplifier may be same to the communication bands supported by the fourth multiplexer, the fifth multiplexer and the sixth multiplexer.

In some applications, B5+B12 quadruplex may be chosen as the fourth multiplexer, B8 duplexer as the fifth multiplexer, and B20 duplexer as the sixth multiplexer.

Please further referring to FIG. 3, the first frequency band second reception circuit 201 may include a fourth switch and a third filter bank successively connected, the fourth switch may be connected to the third frequency divider, the third filter bank may be connected to the first frequency band second reception port 1RX2 of the RF transceiver. In the present embodiment, the third filter bank may include at least a multiple frequency bands filter and at least a single frequency band filter. The multiple frequency bands filter and the single frequency band filter operating at corresponding frequency bands may be chosen as required. It should be noted that, communication frequency bands supported by the chosen multiple frequency bands filter and the single frequency band filter should be within the first frequency band, that is within [3400 MHz, 6000 MHz].

Please further referring to FIG. 3, the second frequency band second reception circuit 202 may include a fifth switch and a fourth filter bank successively connected, the fifth switch may be connected to the fourth frequency divider, the fourth filter bank may be connected to the second frequency band second reception port 2RX2 of the RF transceiver. In the present embodiment, the fourth filter bank may also include at least a multiple frequency bands filter and at least a single frequency band filter. The multiple frequency bands filter and the single frequency band filter operating at corresponding frequency bands may be chosen as required. It should be noted that, communication frequency bands supported by the chosen multiple frequency bands filter and the single frequency band filter should be within the second frequency band, that is within [1400 MHz, 2700 MHz].

Please further referring to FIG. 3, the third frequency band second reception circuit 203 may include a sixth switch and a fifth filter bank successively connected, the sixth switch may be connected to the fifth frequency divider, the fifth filter bank may also include at least a multiple frequency bands filter and at least a single frequency band filter. The multiple frequency bands filter and the single frequency band filter operating at corresponding frequency bands may be chosen as required, It should be noted that, the communication bands supported by the chosen multiple frequency bands filter and the single frequency band filter should be within the third frequency band, that is within [600 MHz, 1000 MHz].

Figure 8:
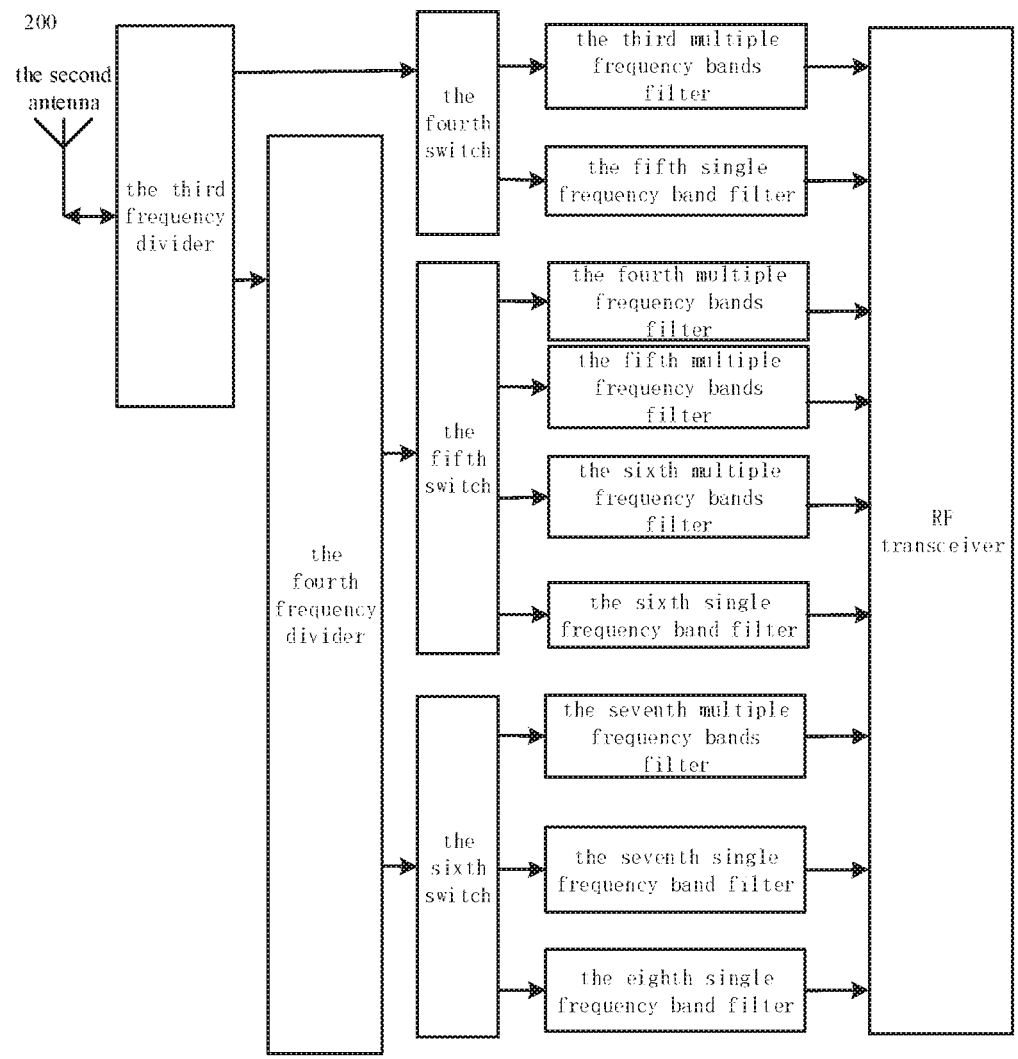
FIG. 8 is a schematic structural diagram of a second. RF circuit in FIG. 3.

Please further referring to FIG. 8, as is shown in FIG. 8, the third filter bank of the first frequency band second reception circuit 201 may include a third multiple frequency bands filter and a fifth single frequency band filter. The third multiple frequency bands filter may be connected to the fourth switch and the second reception port of the RF transceiver operating at corresponding frequency bands. The fifth single frequency band filter may be connected to the fourth switch and the second reception port of the RF transceiver operating at corresponding frequency bands respectively. The fourth switch may be used for gating and switching of communication signals of multiple frequency bands supported by the third multiple frequency bands filter and the fifth single frequency band filter.

In some applications, B46/252/255 multiple frequency bands filter may be chosen as the third multiple frequency bands filter, B42 single frequency band filter as the fifth single frequency band filter. Correspondingly, the second reception port of the RF transceiver operating at corresponding frequency bands connecting to the third multiple frequency bands filter may be a second reception port of B46!252!255 frequency band, and the second reception port of the RF transceiver operating at corresponding frequency bands connecting to the fifth single frequency band filter may be a second reception port of B42 frequency band.

Please further referring to FIG. 8, the fourth filter bank of the second frequency band second reception circuit 202 may include a fourth multiple frequency bands filter, a fifth multiple frequency bands filter, a sixth multiple frequency bands filter, and a sixth single frequency band filter. The fourth multiple frequency bands filter, the fifth multiple frequency bands filter, the sixth multiple frequency bands filter and the sixth single frequency band filter may be each connected to the fifth switch. The sixth multiple frequency bands filter and the sixth single frequency band filter may be both connected to the second reception port of the RF transceiver operating at corresponding frequency bands. The fifth switch may be used for gating and switching of communication signals of multiple frequency bands supported by the fourth multiple frequency bands filter, the fifth multiple frequency bands filter, the sixth multiple frequency bands filter and the sixth single frequency band filter.

In some applications, the B1+B3+B7 multiple frequency bands filter may be chosen as the fourth multiple frequency bands filter, B2+B4/B66+B30 multiple frequency bands filter as the fifth multiple frequency bands filter, B39+B41 multiple frequency bands filter as the sixth multiple frequency bands filter, B40 single frequency band filter as the sixth single frequency band filter.

Please further referring to FIG. 8, the fifth filter bank of the third frequency band second reception circuit 203 may include a seventh multiple frequency bands filter, a seventh single frequency band filter and an eighth single frequency band filter. The seventh multiple frequency bands filter, the seventh single frequency band filter and the eighth single frequency band filter may be each connected to the sixth switch. The seventh multiple frequency bands filter, the seventh single frequency band filter and the eighth single frequency band filter may each be connected to the second reception port of the RF transceiver operating at corresponding frequency bands. The sixth switch may be used for gating and switching of communication signals of multiple frequency bands supported by the seventh multiple frequency bands filter, the seventh single frequency band filter and the eighth single frequency band filter.

In some applications, B5+B12 multiple frequency bands filter may be chosen as the seventh multiple frequency bands filter, B8 single frequency band filter as the seventh single frequency band filter, B20 single frequency band filter as the eighth single frequency band filter.

Please further referring to FIG. 3, the first frequency band third reception circuit 301 may include a sixth filter bank, the second frequency band third reception circuit 302 may include a seventh switch and a seventh filter bank. The sixth filter bank and the seventh switch may each be connected to the fifth frequency divider. The seventh switch may be connected to the seventh filter bank. The sixth filter bank may be connected to the first frequency band third reception port 1RX3 of the RF transceiver. The seventh filter bank may be connected to the second frequency band third reception port 2RX3 of the RF transceiver.

The number of multiple frequency bands filters and single frequency band filters in the sixth filter bank and the seventh bank may all be set as required.

Figure 9:
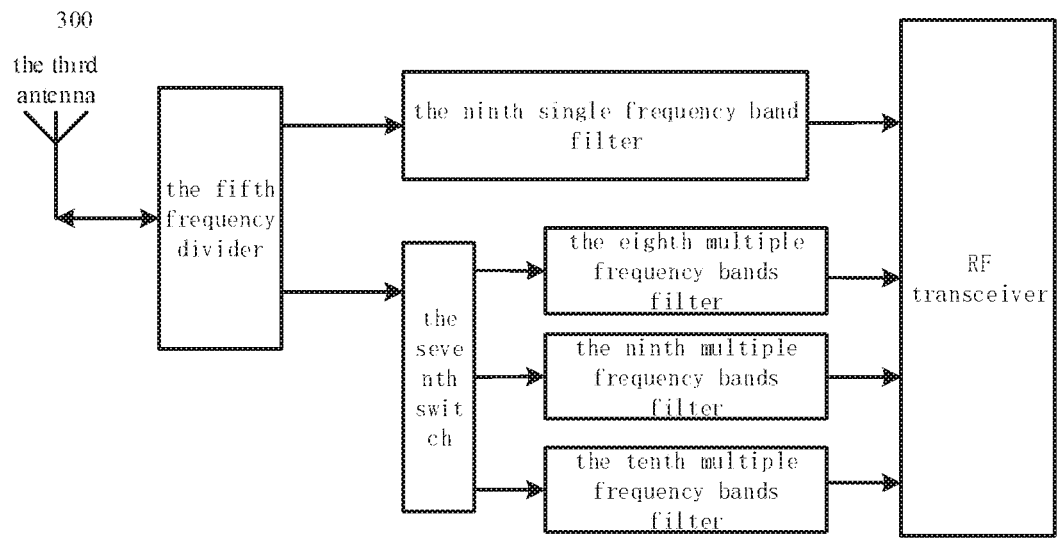
FIG. 9 is a schematic structural diagram of a third RF circuit in FIG. 3.

Please referring to FIG. 9, as is shown in FIG. 9, the sixth filter bank of the first frequency band third reception circuit 301 in FIG. 3 may only include a ninth single frequency band filter. The seventh filter bank may include an eighth multiple frequency bands filter, a ninth multiple frequency bands filter and a tenth multiple frequency bands filter. As is shown in FIG. 9, the ninth single frequency band filter may be connected to the fifth frequency divider and the third reception port of the RF transceiver operating at corresponding frequency bands. The eighth multiple frequency bands filter, the ninth multiple frequency bands filter and the tenth multiple frequency bands filter may each be connected to the seventh switch, and may each be connected to a third reception port of the RF transceiver operating at corresponding frequency hands. The seventh switch may be used for gating and switching of communication signals of multiple frequency bands supported by the eighth multiple frequency bands filter, the ninth multiple frequency bands filter and the tenth multiple frequency bands filter.

In some applications, the B42 single frequency band filter may be chosen as the ninth single frequency band filter, the B1+B3+B7 multiple frequency bands filter as the eighth multiple frequency bands filter, the B2+B4/B66+B30 multiple frequency bands filter as the ninth multiple frequency bands filter, the B39+B41 multiple frequency bands filter as the tenth multiple frequency bands filter.

Please further referring to FIG. 3, the first frequency band fourth reception circuit 401 may include the eighth filter bank, the second frequency band fourth reception circuit 402 may include an eighth switch and a ninth filter bank. The eighth filter bank and the eighth switch may each be connected to the sixth frequency divider. The eighth switch may also be connected to the ninth filter bank. The eighth filter bank may be connected to the first frequency band fourth reception port 1RX4 of the RF transceiver. The ninth filter bank may be connected to the second frequency band fourth reception port 2RX4 of the RF transceiver.

Figure 10:
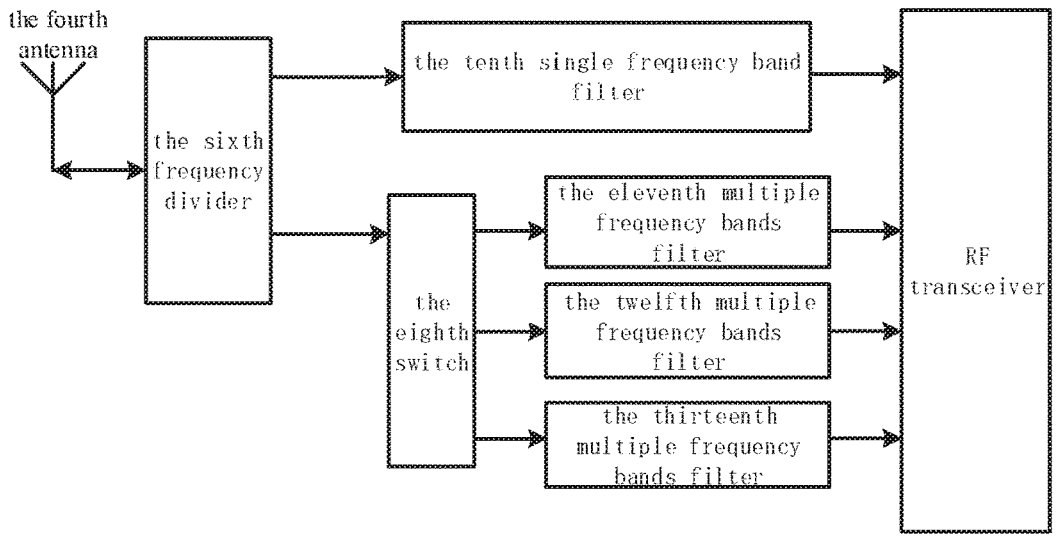
FIG. 10 is a schematic structural diagram of a fourth RF circuit in FIG. 3.

Please referring to FIG. 10, as is shown in FIG. 10, the eighth filter bank of the first frequency band fourth reception circuit 401 in FIG. 3 may only include a tenth single frequency band filter. The ninth filter bank may include an eleventh multiple frequency bands filter, a twelfth multiple frequency bands filter and a thirteenth multiple frequency bands filter. As is shown in FIG. 10, the tenth single frequency band filter may be connected to the sixth frequency divider and the fourth reception port of the RF transceiver operating at corresponding frequency bands. The eleventh multiple frequency bands filter, the twelfth multiple frequency bands filter and the thirteenth multiple frequency bands filter may each be connected to the eighth switch, and may each be connected to a fourth reception port of the RF transceiver operating at corresponding frequency bands. The eighth switch may be used for gating and switching of communication signals of multiple frequency bands supported by the eleventh multiple frequency bands filter, the twelfth multiple frequency bands filter and the thirteenth multiple frequency bands filter.

In some applications, the B42 single frequency band filter may be chosen as the tenth single frequency band filter, the B1+B3+B7 multiple frequency bands filter as the eleventh multiple frequency bands filter, the B2+B4/B66+B30 multiple frequency bands filter as the twelfth multiple frequency hands filter, the B37+B41 multiple frequency bands filter as the thirteenth multiple frequency bands filter.

In the above-mentioned RF front-end circuit, multiple groups of filter banks and/or multiplexer groups may be arranged in each RF circuit, the communication frequency bands supported by multiple groups of filter banks in the same RF circuit may be different, the communication frequency bands supported by the multiplexer groups may also be different, the communication frequency bands supported by the filters in the filter bank and the multiplexer in the multiplexer groups may also be different, therefore the RF front-end circuit may be applied to LTE downlink 4×4 MIMO of multiple frequency bands and LTE downlink carrier aggregations of multiple frequency bands.

Further, the present disclosure may also provide an embodiment of a circuit board. The circuit board may be configured for arranging an RF front-end circuit. A preset position for preparing the first RF circuit 100, the second frequency circuit 200, the third RF circuit 300 and the fourth RF circuit 400 that are independent from each other may be preset on the circuit board. In practical applications, corresponding components of corresponding RF circuits may be bonded or welded on the circuit board as required, to form the finished RF front-end circuit. In situations where only LTE downlink 2×2 MEMO and carrier aggregations needs to be realized, part or all of the components of the third RF circuit 300 and the fourth RF circuit 400 may be omitted, without affecting the operation of the first RF circuit 100 and the second RF circuit 200. If it is necessary to realize LTE downlink 4×4 MIMO and carrier aggregation, then the components of the first RF circuit 100, the second RF circuit 200, the third RF circuit 300 and the fourth RF circuit 400 may be all or partly bonded or welded on the circuit board.

In the present embodiment, the first RF circuit 100, the second. RF circuit 200, the third RF circuit 300 and the fourth RF circuit 400 may be the RF front-end circuits illustrated in FIG. 1 to FIG. 10.

In the present embodiment, preset positions may be preset on the circuit board for four RF circuits that operate independently from each other. When preparing the RF front-end circuits, part or all of the components of the RF circuit may be bonded or welded as required, thereby achieving a flexible design of LTE downlink 4×4 MEMO RF circuit and LTE downlink 2×2. MEMO RF circuit. In addition, when it is not necessary to implement LTE downlink 4×4 MEMO and carrier aggregation, some or all of the components of the third RF circuit 300 and the fourth RF circuit 400 may not be bonded or welded, thereby saving the manufacturing cost.

Figure 11:
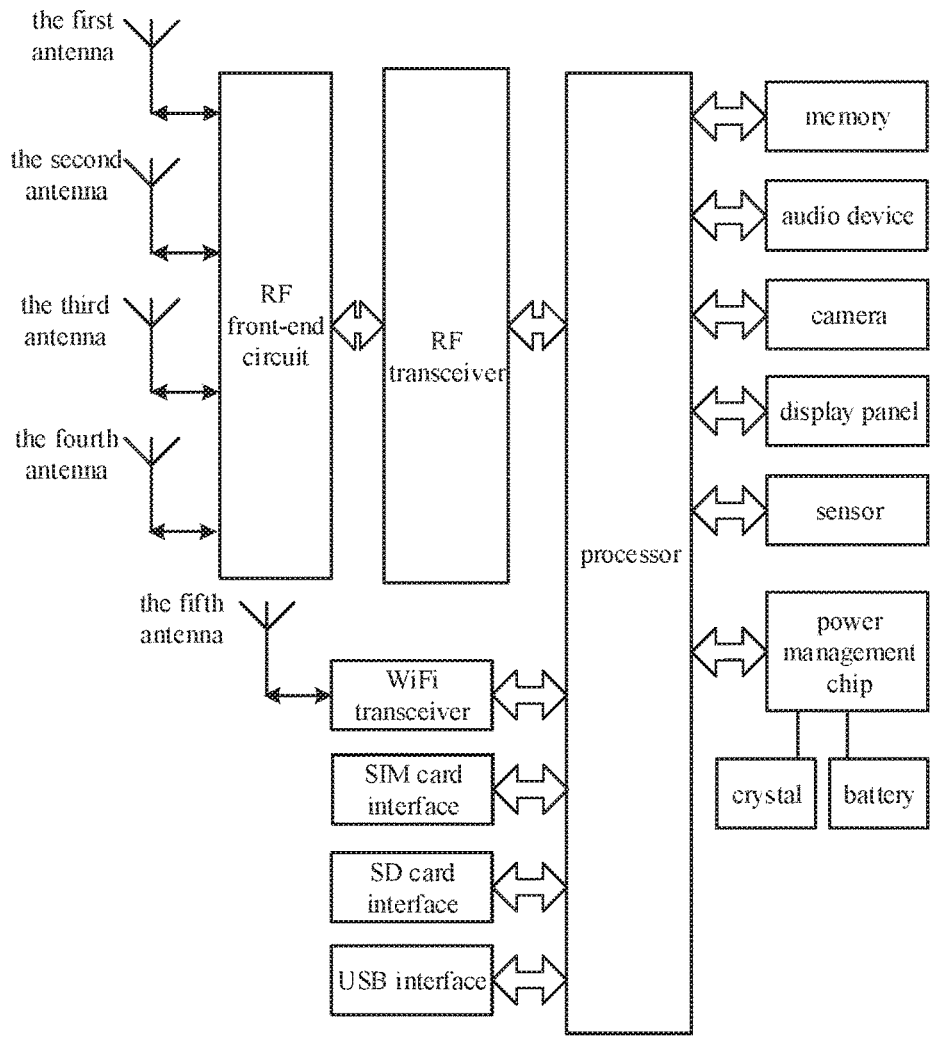
FIG. 11 is a schematic structural diagram of a multiple frequency band communication terminal according to an embodiment of the present disclosure.

Please further referring to FIG. 11, FIG. 11 is a schematic structural diagram of a multiple frequency band communication terminal according to an embodiment of the present disclosure. As is shown in FIG. 11, terminals of the present embodiment may include an antenna, an RF front-end circuit, a processor, a fifth antenna and a Wi-Fi transceiver. The antennas may include the first antenna, the second antenna, the third antenna and the fourth antenna.

As is shown in FIG. 11, the RF transceiver may be connected to the processor. The fifth antenna may be an Wi-Fi antenna. The fifth antenna may be connected to a transceiver. The Wi-Fi transceiver may be connected to the processor. Further, the terminal's SIM card interfaces, SD card interfaces, USB interfaces, memories, audio devices, cameras, display screens, sensors, and power management chips are all connected to the processor. In addition, the crystal and the battery may be respectively connected to the power management chip.

The RF front-end circuit of the present embodiment may be the RF front-end circuit shown in FIG. 1 to FIG. 10. Please referring to the schematic structural diagram and literal description of the RF front-end circuit shown in FIG. 1 to FIG. 10 for the specific structure, which is not repeated here.

The above are only implementations of the present disclosure, and do not limit the patent scope of the present disclosure. Any equivalent changes to the structure or processes made by the description and drawings of the present disclosure or directly or indirectly used in other related technical field are included in the patent protection scope of the present disclosure.

What is claimed is:

1. A multiple frequency band communication terminal, comprising: an RF front-end circuit, a processor, a fifth antenna and a Wi-Fi transceiver; wherein an RF transceiver of the RF front-end circuit is connected to the processor, the fifth antenna is connected to the processor through the Wi-Fi transceiver; the RF front-end circuit comprising:
   an RF transceiver and a first RF circuit, a second RF circuit, a third RF circuit and a fourth RF circuit each connecting to the RF transceiver; the first RF circuit is connected to a first antenna, the second RF circuit is connected to a second antenna, the third RF circuit is connected to a third antenna, the fourth RF circuit is connected to a fourth antenna;
   wherein the first RF circuit, the second RF circuit, the third RF circuit and the fourth RF circuit are independent from each other,
   the first RF circuit comprises a first frequency divider, a second frequency divider, a first-frequency-band transmission-and-first-reception circuit, a second-frequency-band transmission-and-first-reception circuit, a third-frequency-band transmission-and-first-reception circuit;
   the first frequency divider is connected to the first antenna, the first-frequency-band transmission-and-first-reception circuit and the second frequency divider, the second frequency divider is further connected to the second-frequency-band transmission-and-first-reception circuit and the third-frequency-band transmission-and-first-reception circuit;
   the first-frequency-band transmission-and-first-reception circuit is connected to a first-frequency-band transmission port and a first-frequency-band first-reception port of the RF transceiver, the second-frequency-band transmission-and-first-reception circuit is connected to a second-frequency-band transmission port and a second-frequency-band first-reception port of the RF transceiver, the third-frequency-band transmission-and-first-reception circuit is connected to a third-frequency-band transmission port and a third-frequency-band first-reception port of the RF transceiver;
   wherein a frequency of a first-frequency-band signal transmitted by the first-frequency-band transmission-and-first-reception circuit is greater than a frequency of a second-frequency-band signal transmitted by the second-frequency-band transmission-and-first-reception circuit, a frequency of the second-frequency-band signal transmitted by the second-frequency-band transmission-and-first-reception circuit is greater than a frequency of a third-frequency-band signal transmitted by the third-frequency-band transmission-and-first-reception circuit.

2. The terminal according to claim 1, wherein
   the first-frequency-band transmission-and-first-reception circuit comprises a first switch and a first filter bank;
   the first switch is connected to the first frequency divider, and is connected to the first-frequency-band transmission port and the first-frequency-band first-reception port of the RF transceiver operating at corresponding frequency bands through the first filter bank;
   wherein the first filter bank comprises at least a multiple frequency bands filter and at least a single frequency band filter, communication frequency bands supported by the at least a multiple frequency bands filter and the at least a single frequency band filter are different from each other;
   wherein the second-frequency-band transmission-and-first-reception circuit comprises a second switch, a fourth-frequency-band transmission-and-first-reception circuit and a fifth-frequency-band transmission-and-first-reception circuit;
   the second switch is connected to the second frequency divider, the fourth-frequency-band transmission-and-first-reception circuit and the fifth-frequency-band transmission-and-first-reception circuit; the fourth-frequency-band transmission-and-first-reception circuit is connected to a fourth-frequency-band transmission port and a fourth-frequency-band first-reception port of the RF transceiver,
   the fifth-frequency-band transmission-and-first-reception circuit is connected to a fifth-frequency-band transmission port and a fifth-frequency-band first-reception port of the RF transceiver;
   wherein a frequency of a fourth frequency band is greater than a frequency of a fifth frequency band;
   the fourth-frequency-band transmission-and-first-reception circuit comprises a second filter bank and a first multiplexer; the second switch is connected to the second filter bank and a first multiplexer respectively, the second filter bank is connected to corresponding fourth-frequency-band transmission port and fourth-frequency-band first-reception port of the RF transceiver, the first multiplexer is connected to the corresponding fourth-frequency-band transmission port and the corresponding fourth-frequency-band first-reception port of the RF transceiver;
   the fifth-frequency-band transmission-and-first-reception circuit comprises a second multiplexer, a third multiplexer and a third filter bank; the second switch is connected to the second multiplexer, the third multiplexer and the third filter bank respectively; the second multiplexer, the third multiplexer and the third filter bank is each connected to the corresponding fifth-frequency-band transmission port and the corresponding fifth-frequency-band first-reception port of the RF transceiver;

wherein the second filter bank comprises at least a multiple frequency bands filter and at least a single frequency band filter, and communication frequency bands supported by the at least a multiple frequency bands filter, the at least a single frequency band filter and a first duplexer are different from each other; the third filter bank comprises at least a single frequency band filter, and communication frequency bands supported by the second multiplexer, the third multiplexer and the third filter bank are different from each other;

the third-frequency-band transmission-and-first-reception circuit comprises the third switch and the first multiplexer group, the first multiplexer group comprises at least a multiplexer, communication frequency bands supported by the at least a multiplexer are different from each other;

the third switch is connected to the second frequency divider, and is connected to each multiplexer in the first multiplexer group, each multiplexer of the first multiplexer group is respectively connected to the corresponding third-frequency-band transmission port and the corresponding third-frequency-band first-reception port of the RF transceiver.

3. The terminal according to claim 1, wherein
the second RF circuit comprises the third frequency divider, the fourth frequency divider, the first-frequency-band second-reception circuit, the second-frequency-band second-reception circuit, the third-frequency-band second-reception circuit;

the third frequency divider is connected to the second antenna, the first-frequency-band second-reception circuit and the fourth frequency divider; the fourth frequency divider is connected to the second-frequency-band second-reception circuit and the third-frequency-band second-reception circuit; the first-frequency-band second-reception circuit is connected to a first-frequency-band second-reception port of the RF transceiver, the second-frequency-band second-reception circuit is connected to a second-frequency-band second-reception port of the RF transceiver, the third-frequency-band second-reception circuit is connected to a third-frequency-band second-reception port of the RF transceiver;

the first-frequency-band second-reception circuit comprises a fourth switch and a third filter bank connected successively, the second-frequency-band second-reception circuit comprises a fifth switch and a fourth filter bank connected successively, the third-frequency-band second-reception circuit comprises a sixth switch and a fifth filter bank connected successively; the fourth switch is connected to the third frequency divider, the fifth switch and the sixth switch is each connected to the fourth frequency divider;

wherein communication frequency bands supported by the third filter bank, the fourth filter bank and the fifth filter bank are different from each other;

the third RF circuit comprises a fifth frequency divider, a first-frequency-band third-reception circuit and a second-frequency-band third-reception circuit;

the fifth frequency divider is connected to the third antenna, the first-frequency-band third-reception circuit and the second-frequency-band third-reception circuit; the first-frequency-band third-reception circuit is connected to a first-frequency-band third-reception port of the RF transceiver, the second-frequency-band third-reception circuit is connected to a second-frequency-band third-reception port of the RF transceiver;

the first-frequency-band third-reception circuit comprises a sixth filter bank, the second-frequency-band third-reception circuit comprises a seventh switch and a seventh filter bank connected successively; the seventh switch is connected to the fifth frequency divider;

wherein communication frequency bands supported by the sixth filter bank and the seventh filter bank are different from each other;

the fourth RF circuit comprises a sixth frequency divider, a first-frequency-band fourth-reception circuit and a second-frequency-band fourth-reception circuit;

the sixth frequency divider is connected to the fourth antenna, the first-frequency-band fourth-reception circuit and the second-frequency-band fourth-reception circuit; the first-frequency-band fourth-reception circuit is connected to a first-frequency-band fourth-reception port of the RF transceiver, the second-frequency-band fourth-reception circuit is connected to a second-frequency-band fourth-reception port of the RF transceiver;

the first-frequency-band fourth-reception circuit comprises an eighth filter bank, the second-frequency-band fourth-reception circuit comprises an eighth switch and a ninth filter bank connected successively; the eighth switch is connected to the sixth frequency divider;

wherein communication frequency bands supported by the eighth filter bank and the ninth filter bank are different from each other.

4. A circuit board, wherein preset positions for preparing a first RF circuit, a second RF circuit, a third RF circuit and a fourth RF circuit independent from each other are preset on the circuit board;

wherein the first RF circuit, the second RF circuit, the third RF circuit and the fourth RF circuit are configured to be connected to an RF transceiver, the first RF circuit is connected to a first antenna, the second RF circuit is connected to a second antenna, the third RF circuit is connected to a third antenna, the fourth RF circuit is connected to a fourth antenna;

wherein the first RF circuit, the second RF circuit, the third RF circuit and the fourth RF circuit are independent from each other, wherein the preset positions for preparing the first RF circuit comprises preset positions for preparing a first frequency divider, a second frequency divider, a first-frequency-band transmission-and-first-reception circuit, a second-frequency-band transmission-and-first-reception circuit, a third-frequency-band transmission-and-first-reception circuit;

based on the preset position for the first frequency divider, the first frequency divider is connected to the first antenna, the first-frequency-band transmission-and-first-reception circuit and the second frequency divider, the second frequency divider is further connected to the second-frequency-band transmission-and-first-reception circuit and the third-frequency-band transmission-and-first-reception circuit;

the first-frequency-band transmission-and-first-reception circuit is connected to a first-frequency-band transmission port and a first-frequency-band first-reception port of the RF transceiver, the second-frequency-band transmission-and-first-reception circuit is connected to a second-frequency-band transmission port and a second-frequency-band first-reception port of the RF transceiver, the third-frequency-band transmission-and-first-reception circuit is connected to a third-frequency-band transmission port and a third-frequency-band first-reception port of the RF transceiver.

5. The circuit board according to claim 4, wherein based on the preset position for the first-frequency-band transmission-and-first-reception circuit, the first-frequency-band transmission-and-first-reception circuit comprises a first switch and a first filter bank;
the first switch is connected to the first frequency divider, and is connected to the first-frequency-band transmission port and the first-frequency-band first-reception port of the RF transceiver operating at corresponding frequency bands through the first filter bank;
wherein the first filter bank comprises at least a multiple frequency bands filter and at least a single frequency band filter, communication frequency bands supported by the at least a multiple frequency bands filter and the at least a single frequency band filter are different from each other.

6. The circuit board according to claim 4, wherein based the preset position for the second-frequency-band transmission-and-first-reception circuit, the second-frequency-band transmission-and-first-reception circuit comprises a second switch, a fourth-frequency-band transmission-and-first-reception circuit and a fifth-frequency-band transmission-and-first-reception circuit;
the second switch is connected to the second frequency divider, the fourth-frequency-band transmission-and-first-reception circuit and the fifth-frequency-band transmission-and-first-reception circuit; the fourth-frequency-band transmission-and-first-reception circuit is connected to a fourth-frequency-band transmission port and a fourth-frequency-band first-reception port of the RF transceiver, the fifth-frequency-band transmission-and-first-reception circuit is connected to a fifth-frequency-band transmission port and a fifth-frequency-band first-reception port of the RF transceiver;
wherein a frequency of a fourth frequency band is greater than a frequency of a fifth frequency band;
the fourth-frequency-band transmission-and-first-reception circuit comprises the second filter bank and the first multiplexer;
the second switch is connected to the second filter bank and the first multiplexer, the second filter bank is connected to the corresponding fourth-frequency-band transmission port and the corresponding fourth-frequency-band first-reception port, and the first multiplexer is connected to the corresponding fourth-frequency-band transmission port and the corresponding fourth-frequency-band first-reception port;
the fifth-frequency-band transmission-and-first-reception circuit comprises a second multiplexer, a third multiplexer and a third filter bank; the second switch is connected to the second multiplexer, the third multiplexer and the third filter bank; the second multiplexer, the third multiplexer and the third filter bank is each connected to the corresponding fifth-frequency-band transmission port and the corresponding fifth-frequency-band first-reception port of the RF transceiver;
wherein the second filter bank comprises at least a multiple frequency bands filter and at least a single frequency band filter, and communication frequency bands supported by the at least a multiple frequency bands filter, at least a single frequency band filter and a first duplexer are different from each other; the third filter bank comprises at least a single frequency band filter, and communication frequency bands supported by the second multiplexer, the third multiplexer and the third filter bank are different from each other.

7. The circuit board according to claim 4, wherein based on the preset positions for the third-frequency-band transmission-and-first-reception circuit, the third-frequency-band transmission-and-first-reception circuit comprises the third switch and the first multiplexer group, the first multiplexer group comprises at least a multiplexer, communication frequency bands supported by the at least a multiplexer are different from each other;
the third switch is connected to the second frequency divider, and is connected to each multiplexer in the first multiplexer group, each multiplexer of the first multiplexer group is respectively connected to the corresponding third-frequency-band transmission port and the corresponding third-frequency-band first-reception port of the RF transceiver.

8. The circuit board according to claim 4, wherein the preset positions for preparing the second RF circuit comprises preset positions for preparing a third frequency divider, a fourth frequency divider, a first-frequency-band second-reception circuit, a second-frequency-band second-reception circuit, a third-frequency-band second-reception circuit;
based on the preset positions for the third frequency divider, the third frequency divider is connected to the second antenna, the first-frequency-band second-reception circuit and the fourth frequency divider; the fourth frequency divider is further connected to the second-frequency-band second-reception circuit and the third-frequency-band second-reception circuit respectively; the first-frequency-band second-reception circuit is connected to a first-frequency-band second-reception port of the RF transceiver, the second-frequency-band second-reception circuit is connected to a second-frequency-band second-reception port of the RF transceiver, the third-frequency-band second-reception circuit is connected to a third-frequency-band second-reception port of the RF transceiver;
the first-frequency-band second-reception circuit comprises a fourth switch and a third filter bank connected successively, the second-frequency-band second-reception circuit comprises a fifth switch and a fourth filter bank connected successively, the third-frequency-band second-reception circuit comprises a sixth switch and a fifth filter bank connected successively; the fourth switch is connected to the third frequency divider, the fifth switch and the sixth switch is each connected to the fourth frequency divider;
wherein communication frequency bands supported by the third filter bank, the fourth filter bank and the fifth filter bank are different from each other.

9. The circuit board according to claim 4, wherein the preset positions for preparing the third RF circuit comprises preset positions for preparing a fifth frequency divider, the first-frequency-band third-reception circuit and the second-frequency-band third-reception circuit;
based on the preset positions for the fifth frequency divider, the fifth frequency divider is connected to the third antenna, the first-frequency-band third-reception circuit and the second-frequency-band third-reception circuit; the first-frequency-band third-reception circuit is connected to a first-frequency-band third-reception port of the RF transceiver, the second-frequency-band third-reception circuit is connected to a second-frequency-band third-reception port of the RF transceiver;

the first-frequency-band third-reception circuit comprises a sixth filter bank, the second-frequency-band third-reception circuit comprises a seventh switch and a seventh filter bank connected successively; the seventh switch is connected to the fifth frequency divider;

wherein communication frequency bands supported by the sixth filter bank and the seventh filter bank are different from each other.

10. The circuit board according to claim 4, wherein the preset positions for preparing the fourth RF circuit comprises preset positions for preparing a sixth frequency divider, a first-frequency-band fourth-reception circuit and a second-frequency-band fourth-reception circuit;

based on the preset positions for the sixth frequency divider, the sixth frequency divider is connected to the fourth antenna, the first-frequency-band fourth-reception circuit and the second-frequency-band fourth-reception circuit; the first-frequency-band fourth-reception circuit is connected to a first-frequency-band fourth-reception port of the RF transceiver, the second-frequency-band fourth-reception circuit is connected to a second-frequency-band fourth-reception port of the RF transceiver;

the first-frequency-band fourth-reception circuit comprises an eighth filter bank, the second-frequency-band fourth-reception circuit comprises an eighth switch and a ninth filter bank connected successively; the eighth switch is connected to the sixth frequency divider;

wherein communication frequency bands supported by the eighth filter bank and the ninth filter bank are different from each other.

11. An RF front-end circuit, comprising:
an RF transceiver and a first RF circuit, a second RF circuit, a third RF circuit and a fourth RF circuit each connecting to the RF transceiver; the first RF circuit is connected to a first antenna, the second RF circuit is connected to a second antenna, the third RF circuit is connected to a third antenna, the fourth RF circuit is connected to a fourth antenna;

wherein the first RF circuit, the second RF circuit, the third RF circuit and the fourth RF circuit are independent from each other;

the first RF circuit comprises a first frequency divider, a second frequency divider, a first-frequency-band transmission-and-first-reception circuit, a second-frequency-band transmission-and-first-reception circuit, a third-frequency-band transmission-and-first-reception circuit;

the first frequency divider is connected to the first antenna, the first-frequency-band transmission-and-first-reception circuit and the second frequency divider, the second frequency divider is further connected to the second-frequency-band transmission-and-first-reception circuit and the third-frequency-band transmission-and-first-reception circuit;

the first-frequency-band transmission-and-first-reception circuit is connected to a first-frequency-band transmission port and a first-frequency-band first-reception port of the RF transceiver, the second-frequency-band transmission-and-first-reception circuit is connected to a second-frequency-band transmission port and a second-frequency-band first-reception port of the RF transceiver, the third-frequency-band transmission-and-first-reception circuit is connected to a third-frequency-band transmission port and a third-frequency-band first-reception port of the RF transceiver.

12. The RF front-end circuit according to claim 11, wherein
the first-frequency-band transmission-and-first-reception circuit comprises a first switch and a first filter bank;
the first switch is connected to the first frequency divider, and is connected to the first-frequency-band transmission port and the first-frequency-band first-reception port of the RF transceiver operating at corresponding frequency bands through the first filter bank;
wherein the first filter bank comprises at least a multiple frequency bands filter and at least a single frequency band filter, communication frequency bands supported by the at least a multiple frequency bands filter and the at least a single frequency band filter are different from each other.

13. The RF front-end circuit according to claim 11, wherein
the second-frequency-band transmission-and-first-reception circuit comprises a second switch, a fourth-frequency-band transmission-and-first-reception circuit- and a fifth-frequency-band transmission-and-first-reception circuit;
the second switch is connected to the second frequency divider, the fourth-frequency-band transmission-and-first-reception circuit-and the fifth-frequency-band transmission-and-first-reception circuit; the fourth-frequency-band transmission-and-first-reception circuit is connected to a fourth-frequency-band transmission port and a fourth-frequency-band first-reception port of the RF transceiver, the fifth-frequency-band transmission-and-first-reception circuit is connected to a fifth-frequency-band transmission port and a fifth-frequency-band first-reception port of the RF transceiver;
wherein a frequency of a fourth frequency band is greater than a frequency of a fifth frequency band;
the fourth-frequency-band transmission-and-first-reception circuit-comprises the second filter bank and the first multiplexer;
the second switch is connected to the second filter bank and the first multiplexer respectively, the second filter bank is connected to the corresponding fourth-frequency-band transmission port and the corresponding fourth-frequency-band first-reception port, and the first multiplexer is connected to the corresponding fourth-frequency-band transmission port and the corresponding fourth-frequency-band first-reception port;
the fifth-frequency-band transmission-and-first-reception circuit comprises a second multiplexer, a third multiplexer and a third filter bank; the second switch is connected to the second multiplexer, the third multiplexer and the third filter bank respectively; the second multiplexer, the third multiplexer and the third filter bank are each connected to the corresponding fifth-frequency-band transmission port and the corresponding fifth-frequency-band first-reception port of the RF transceiver;
wherein the second filter bank comprises at least a multiple frequency bands filter and at least a single frequency band filter, and communication frequency bands supported by the at least a multiple frequency bands filter, the at least a single frequency band filter and a first duplexer are different from each other; the third filter bank comprises at least a single frequency band filter, and communication frequency bands supported by the second multiplexer, the third multiplexer and the third filter bank are different from each other.

14. The RF front-end circuit according to claim 11, wherein the third-frequency-band transmission-and-first-reception circuit comprises the third switch and the first multiplexer group, the first multiplexer group comprises at least a multiplexer, communication frequency bands supported by the at least a multiplexer are different from each other;

the third switch is connected to the second frequency divider, and is connected to each multiplexer in the first multiplexer group, every multiplexer of the first multiplexer group is each connected to the corresponding third-frequency-band transmission port and the corresponding third-frequency-band first-reception port of the RF transceiver.

15. The RF front-end circuit according to claim 11, wherein the second RF circuit comprises a third frequency divider, a fourth frequency divider, a first-frequency-band second-reception circuit, a second-frequency-band second-reception circuit, a third-frequency-band second-reception circuit;

the third frequency divider is connected to the second antenna, the first-frequency-band second-reception circuit and the fourth frequency divider; the fourth frequency divider is connected to the second-frequency-band second-reception circuit and the third-frequency-band second-reception circuit; the first-frequency-band second-reception circuit is connected to a first-frequency-band second-reception port of the RF transceiver, the second-frequency-band second-reception circuit is connected to a second-frequency-band second-reception port of the RF transceiver, the third-frequency-band second-reception circuit is connected to a third-frequency-band second-reception port of the RF transceiver;

the first-frequency-band second-reception circuit comprises a fourth switch and a third filter bank connected successively, the second-frequency-band second-reception circuit comprises a fifth switch and a fourth filter bank connected successively, the third-frequency-band second-reception circuit comprises a sixth switch and a fifth filter bank connected successively; the fourth switch is connected to the third frequency divider, the fifth switch and the sixth switch is each connected to the fourth frequency divider;

wherein communication frequency bands supported by the third filter bank, the fourth filter bank and the fifth filter bank are different from each other.

16. The RF front-end circuit according to claim 11, wherein the third RF circuit comprises a fifth frequency divider, a first-frequency-band third-reception circuit and a second-frequency-band third-reception circuit;

the fifth frequency divider is connected to the third antenna, the first-frequency-band third-reception circuit and the second-frequency-band third-reception circuit; the first-frequency-band third-reception circuit is connected to a first-frequency-band third-reception port of the RF transceiver, the second-frequency-band third-reception circuit is connected to a second-frequency-band third-reception port of the RF transceiver;

the first-frequency-band third-reception circuit comprises a sixth filter bank, the second-frequency-band third-reception circuit comprises a seventh switch and a seventh filter bank connected successively; the seventh switch is connected to the fifth frequency divider;

wherein communication frequency bands supported by the sixth filter bank and the seventh filter bank are different from each other.

17. The RF front-end circuit according to claim 11, wherein the fourth RF circuit comprises a sixth frequency divider, a first-frequency-band fourth-reception circuit and a second-frequency-band fourth-reception circuit;

the sixth frequency divider is connected to the fourth antenna, the first-frequency-band fourth-reception circuit and the second-frequency-band fourth-reception circuit; the first-frequency-band fourth-reception circuit is connected to a first-frequency-band fourth-reception port of the RF transceiver, the second-frequency-band fourth-reception circuit is connected to a second-frequency-band fourth-reception port of the RF transceiver;

the first-frequency-band fourth-reception circuit comprises an eighth filter bank, the second-frequency-band fourth-reception circuit comprises an eighth switch and a ninth filter bank connected successively; the eighth switch is connected to the sixth frequency divider;

wherein communication frequency bands supported by the eighth filter bank and the ninth filter bank are different from each other.

* * * * *